Sept. 7, 1948.  H. R. FIFE ET AL  2,448,664
POLYOXYPROPYLENE COMPOUNDS
Filed May 30, 1944
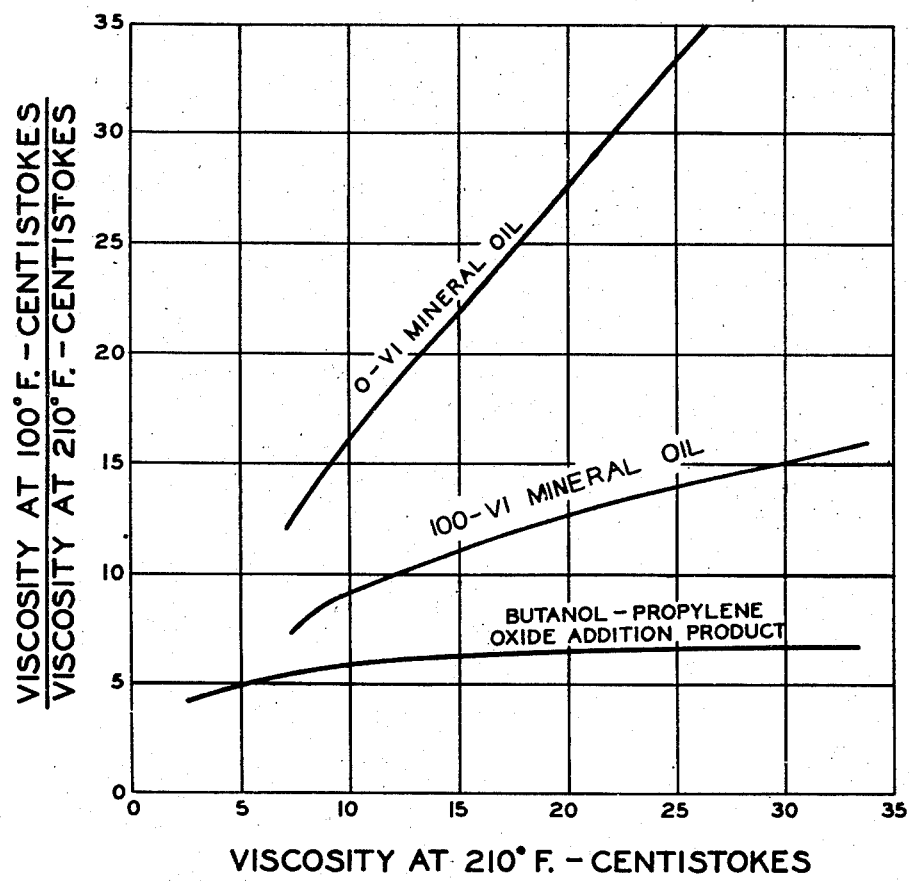
INVENTORS
HARVEY R. FIFE
FREDERICK H. ROBERTS
BY
ATTORNEY Patented Sept. 7, 1948

2,448,664

UNITED STATES PATENT OFFICE 2,448,664

POLYOXYPROPYLENE COMPOUNDS

Harvey R. Fife, Mount Lebanon, Pa., and Frederick H. Roberts, Charleston, W. Va., assignors to Carbide and Carbon Chemicals Corporation, a corporation of New York Application May 30, 1944, Serial No. 538,098

6 Claims. (Cl. 260—615)

This invention relates to polyoxyalkylene monohydroxy compounds which are aliphatic monoethers of polyoxyalkylene glycols. It is more particularly concerned with such monohydroxy polyoxyalkylene products having lubricating properties which are aliphatic monoethers of polyoxyalkylene glycols of relatively high average molecular weight, and in which the polyoxyalkylene chains thereof are formed predominantly of the oxy 1,2-propylene group, —$OC_2H_3(CH_3)$—, as may result for instance, from the addition of an alkylene oxide predominantly containing 1,2-propylene oxide to a monohydroxy aliphatic alcohol. Improved methods of making such products are an important part of the invention.

Polyoxyethylene glycols, $H(OC_2H_4)_xOH$, of relatively high molecular weight are known and may be obtained by the addition of ethylene oxide, $C_2H_4O$, to water or to an ethylene glycol of lower molecular weight, for instance, ethylene glycol, diethylene glycol and the like in the presence of catalysts. The resulting reaction products are believed to be complex mixtures of polyoxyethylene glycols of various molecular weights depending on the length of the polyoxyethylene chain, —$(OC_2H_4)_x$—, which is built up by the addition of the oxyethylene group, —$OC_2H_4$—, to the individual molecules. Depending upon the molecular weight, the melting or fusion temperatures of these products are given as ranging from about —50° C. to 10° C., for an average molecular weight of about 200 to 300, up to about 60° C. to 65° C., for an average molecular weight of about 3,000 to 4,000. At normal temperatures, the polyoxyethylene glycols of an average molecular weight of about 60 to 800 have the consistency of a semi-fluid, pasty mass. Below this range of average molecular weights, the products are clear, colorless, normally-liquid compositions which are miscible with water in all proportions. At and above an average molecular weight of about 800 to 900, the polyoxyethylene glycols are low-melting normally-solid compositions having a fusion temperature which increases with increasing molecular weight from about 30° C. to a maximum of about 60° C. to 65° C. These normally solid products are also said to be miscible with water in all proportions.

The average molecular weight of these ethylene oxide addition products, as determined by the ebullioscopic method or calculated from viscosity measurements or acetyl values, are often lower than those calculated from the amount of ethylene oxide employed. The difference may be accounted for by a number of factors including the isomerization of ethylene oxide to acetaldehyde, side reactions arising out of the presence of aldehydes or other impurities or the forming of polyoxyethylene compounds of low molecular weight during the course of the addition reaction.

Complex mixtures such as result from the addition of ethylene oxide to monohydroxy compounds have also been made heretofore. Depending to some extent upon the particular monohydroxy compound which is the starting material and the average molecular weight of the addition product, the fusion temperatures and the water miscibility of the addition products do not differ greatly from the glycols.

The average molecular weights of these addition products made from monohydroxy compounds calculated from the acetyl values are often lower than those obtained by ebullioscopic methods or from viscosity measurements, all of which may be lower than those calculated from the ethylene oxide used. This lack of agreement may be accounted for, at least in part, by the same factors as affected the determination of the average molecular weights of the glycol.

Although addition products of ethylene oxide have been suggested for use as lubricants, their high melting or solidification temperatures make them unsuitable for use as metal lubricants where fluidity over a wide range of temperatures is required. As far as is known there are no satisfactory solvents which will retain the polyoxyethylene compounds in solution at the lower range of temperatures down to —40° F. to which they may be subjected in service. In textile lubrication where they may be used in aqueous solution, there is a tendency for the diluent and a solid polyoxyethylene component to separate to such an extent as to interfere with proper textile lubrication.

Prior suggestions of the use of 1,2-propylene oxide to make addition products are unaccompanied by description of properties which would permit identification of the product.

We have found that useful and improved polyoxyalkylene compositions which are preponderantly monohydroxy alcohols of relatively high molecular weight may be obtained by the addition to the monohydroxy aliphatic alcohol, (according to methods hereinafter described) of an alkylene oxide predominantly comprising 1,2 propylene oxide.

The reaction which takes place between the alcohol and the 1,2-propylene oxide seems to be a chain addition wherein the alkylene oxide molecules undergo conversion to the corresponding oxyalkylene radical as illustrated for any given molecule by the following general equation:

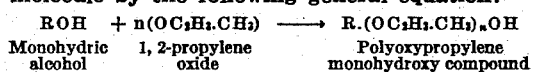

wherein ROH is an aliphatic monohydroxy alcohol; and $n$ represents the number of mols of 1,2-propylene oxide.

We have found that the addition products of 1,2-propylene oxide with monohydric aliphatic alcohols, made according to the methods of this invention, which contain an average of at least eight oxy 1,2-propylene groups in the molecule.

have unusual properties of solubility, viscosity, stability and lubricating ability. In many respects, when used as lubricants for metals and other surfaces, such as rubber, textiles, and the like, they are superior to high-grade mineral oils in stability and in effectiveness over a wide range of temperatures.

These properties are dependent on the molecular compositions, as well as on the method by which the products are made. From such properties as the average molecular weight, determined both by acetylation and ebullioscopy, refractive index, density, viscosity, rate of change of viscosity with change in temperature as well as upon theoretical considerations, it appears that these products are complex mixtures of monohydroxy polyoxypropylene aliphatic monoethers having poly oxypropylene chains of different lengths, with the hydroxyl group appearing at one end of the chain and the aliphatic group of the starting alcohol at the other. The average molecular weight of these products is at least 496, and may extend to 2000 or higher.

Unlike polyoxyethylene compounds, these monohydroxy 1,2-polyoxypropylene aliphatic monoethers are immiscible with water. A small amount of water, usually about 0.25 to 5%, will dissolve in these ethers, but this causes considerably less corrosion difficulties when the products are employed as metal lubricants, than is the case with the polyoxyethylene compounds.

Some of the products of this invention are miscible with paraffinic hydrocarbons at ordinary temperatures, whereas other products are miscible at only slightly elevated temperatures. On the other hand, the polyoxyethylene compounds have much less miscibility with paraffinic hydrocarbons.

The oil miscibility is a function of both the molecular weight of the addition product, and the number of carbon atoms in the alcohol to which propylene oxide is added, as shown by the following data, taken from a smooth curve:

| Alcohol Reacted | Miscibility Temperature, °C. | | |
|---|---|---|---|
| | Methanol | Butanol | 7-Ethyl-2-Methyl undecanol-4 |
| Average Molecular Weight: | | | |
| 600 | 73 | 48 | 5 |
| 800 | 80 | 60 | 25 |
| 1,000 | 87 | 74 | 45 |
| 1,200 | 93 | 88 | 60 |
| 1,400 | 100 | 103 | 75 |
| 1,600 | 110 | 118 | 87 |

The oil employed in determining the above solubilities was a highly refined paraffinic type having a viscosity of 10.73 centistokes at 210° F., a refractive index of 1.4813 at 20° C., and densities at 210° F., 130° F., 100° F., and 68° F. of 0.8202, 0.8479, 0.8582, and 0.8687 respectively.

The 1,2-polyoxypropylene monohydroxy compounds of this invention have unusual temperature-viscosity relationships in that, while they retain adequate body at elevated temperatures, they do not become unusably viscous at low temperatures. All of the products have a viscosity above about 3 centistokes at 210° F., and they do not solidify on cooling to −20° F. In this they are to be contrasted sharply with polyoxyethylene compounds, which solidify at much higher temperatures. The products of this invention are also to be distinguished from mineral oils in that the slope of their viscosity-temperature curve is, in general, less than the slope of the same curve for mineral oils. This relationship is illustrated below and in the attached drawing:

| Viscosity in Centistokes at 210° F. | Ratio of Viscosity in Centistokes at 100° F. and at 210° F. | | | |
|---|---|---|---|---|
| | Butanol-Propylene Oxide Addition Product | 0-VI Mineral Oil | 100-VI Mineral Oil | S. A. E. No. of 100-VI Mineral Oil |
| 3.18 | 4.7 | | | |
| 6.99 | 5.4 | 12.0 | 7.4 | 10 |
| 9.79 | 5.8 | 16.1 | 8.8 | 20 |
| 12.44 | 6.0 | 19.1 | 9.9 | 30 |
| 15.58 | 6.1 | 22.6 | 11.0 | 40 |
| 21.6 | 6.3 | 29.3 | 12.9 | 50 |
| 26.2 | 6.5 | 34.4 | 14.3 | 60 |
| 31.9 | 6.6 | 40.7 | 15.8 | 70 |

It is also significant that, for the products of this invention, the rate of change of viscosity with temperature does not change appreciably as the viscosity of the products increases. In general, for our products, the ratio of viscosity in centistokes at 100° F. to the viscosity in centistokes at 210° F. is below 8.0.

The viscosity of these 1,2-polyoxypropylene monohydroxy products is some exponential function of their average molecular weight. At molecular weights below 2000, all of the addition products appear to have viscosities below about 50 centistokes at 210° F. It is also significant that the products of this invention, having molecular weights of 2000 to 3000, are liquids, whereas the polyoxyethylene compounds of corresponding molecular weights are solids.

A surprising characteristic of the 1,2-polyoxypropylene monohydroxy compounds of our invention is their thermochemical stability at temperatures of 500° F., when prepared according to the methods herein disclosed. This is one property which qualifies the products for use as fluids in hydraulic driving mechanisms for automobiles.

Finally, by standard tests, these 1,2-polyoxypropylene monohydroxy compounds have exhibited excellent lubricating ability for metal and other surfaces, in many instances surpassing mineral oils in their effectiveness. They do not corrode metals, and unlike mineral oils, they do not swell and deteriorate rubber products with which they may come in contact. Standard lubricating tests have also indicated that the products of best lubricating effectiveness are obtained when the addition product contains an average of at least eight 1,2-oxypropylene groups to the molecule.

Such factors as hydrocarbon solubility, viscosity at lower molecular weights, and solubility of water in the 1,2-polyoxypropylene monohydroxy compounds are related to the monohydric alcohol employed as the starting material. Any monohydric aliphatic alcohol may be employed in the reaction. Preferably, however, we employ alkanols containing from 1 to 20 carbon atoms, including both normal and branched chain alcohols, which may be primary, secondary, or tertiary in character. Thus, suitable alkanols which have been used include methanol, ethanol, isopropanol, n-butanol, 2-ethylbutanol, n-hexanol, 2-ethylhexanol, n-octanol and a tetradecanol, comprising 7-ethyl-2-methylundecanol-4. The corresponding mono-alkyl ethers of 1,2-propylene glycol may also be employed. Addition products of the higher alcohols with 1,2-propylene oxide, within the lower molecular weight range, have higher hydrocarbon miscibility, greater viscosity and reduced water solubility.

The number of oxy 1,2-propylene groups introduced into the addition products depends on the molar ratio of alcohol to 1,2-propylene oxide, and on the conditions under which they are brought into reactive contact. In general, our reaction conditions differ from those previously suggested in that we employ alkaline rather than acid catalysts, and in that we exclude all but traces of water from the catalyst and reactants. It has previously been shown that most acid catalysts are unsuitable for making alkylene oxide addition products, and an acidic compound of fluorine, such as boron trifluoride, has been suggested, as a catalyst for alkylene oxide addition reactions. Boron trifluoride, while a catalyst, has the disadvantage that it also promotes the dimerization of the alkylene oxide to dioxane or alkyl derivatives of dioxane as a side reaction product. It also exerts a directional force on the reaction so that products of different properties are obtained. Another disadvantage of the boron trifluoride catalysts is that according to our experience, they do not catalyze the addition reactions beyond the formation of addition products having true average molecular weights above 1000, or at the very most 1200, as determined by ebullioscopy or cryoscopy.

The products of this invention are made under carefully controlled conditions under which the formation of brown or dark colored impurities is avoided. Isomerization of the 1,2-propylene oxide to aldehydes during the reaction is avoided, and it is believed that the polymerization of such aldehydes gives rise to the dark colored impurities. We have found that useful products free from colored impurities of high average molecular weight are obtained by bringing the 1,2-propylene oxide, admixed, if desired, with a small amount of ethylene oxide, into intimate contact with the monohydroxy alcohol starting material in a liquid phase throughout which an alkaline catalyst is uniformly dispersed. For best results it is essential that the addition reaction be carried out under conditions which are closely controlled with respect to such factors as the amount of catalyst employed and the uniformity of its dispersion, the amount of unreacted 1,2-propylene oxide present at any stage during the reaction, the temperature maintained throughout the course of the reaction, and the intimacy and uniformity of contact of the reacting oxide with the reactants to which they are to be added.

As catalyst, a material as strongly alkaline as sodium hydroxide is preferred in an amount which is about 0.2 to 1.0 per cent by weight of the total amount of reactants including the 1,2-propylene oxide appearing in the reaction product. An amount of active catalyst within this range is not so large as to cause excessive decomposition of the alkylene oxide addition product of the main reaction, and excellent results have been obtained with an amount of sodium hydroxide which is about 0.75 per cent by weight of the reactants. By active catalysts is meant the amount of catalyst present which has an alkalinity of the order of that of the alkali metal hydroxide, excluding such compounds of substantially lesser alkalinity as the carbonates and carboxylic acid salts which may be titratable as the hydroxide. Strongly alkaline catalysts other than sodium hydroxide may also be used, for instance, potassium hydroxide, lithium hydroxide, and the like. Instead of the strongly alkaline hydroxides, the corresponding alcoholates may be used, if desired. In general, the stronger the alkalinity of the catalyst, the less is required. All of the catalyst need not be added at the start of the reaction. A suitable amount of the catalyst may be added at the start, and the remainder of the catalyst added from time to time throughout the course of the reaction to maintain a substantially constant catalyst concentration, considering the additions of propylene oxide which have been made, although this is not essential for good results.

The reaction should be carried out at a temperature which is sufficiently high to favor rapid reaction of the 1,2-propylene oxide with the reactants to which it is to be added, starting with the aliphatic monohydroxy alcohol. A rapid reaction rate reduces the time of exposure of the oxide to the catalyst and to the surfaces of the reaction vessel and thus lessens the possibility of isomerizations and the formation of side reaction products, particularly those side reaction products which may be highly colored. With our preferred alkaline catalysts, dry sodium hydroxide or potassium hydroxide or their corresponding alcoholates, we have successfully used reaction temperatures from about 80° C. to 130° C., and we have obtained substantially clear, uncolored products possessing excellent lubricating characteristics which do not deposit sludge, gum or lacquer-film-forming materials, or corrode metal parts when used as metal lubricants. Temperatures as high as 160° C. to 180° C. are, however, not recommended in that products having these desirable properties are not obtained. Our best products were obtained with our preferred alkaline catalysts with the reaction temperature maintained at a temperature of about 90° C. to 110° C., and with a rate of addition of alkylene oxide mixture as hereinafter described.

It is also desirable, and even essential for best results, to avoid excessive concentration of unreacted alkylene oxides in the reaction zone, especially in the presence of such strongly alkaline catalysts as sodium hydroxide, potassium hydroxide, or alkali metal alcoholates. We prefer to supply the 1,2-propylene oxide, together with not more than 10% of ethylene oxide, if desired, to the reaction zone at such a rate as to maintain a controlled concentration of unreacted oxides which is substantially uniform or constant up to the end of the addition reaction. To this end it is desirable to conduct the reaction in a closed system and to introduce the oxide or oxides at a rate which will maintain a substantially uniform pressure. Preferably, the pressure should be maintained at about 5 to 65 p. s. i. although under certain conditions pressures as high as 200 p. s. i. may be used. (By the abbreviation or symbol, p. s. i., as used herein is meant pounds per square inch, gauge.) A nonreactive gas, such as nitrogen, may be present to assist in maintaining the pressure. We prefer also to cycle the liquid in the reaction vessel, or to agitate it vigorously, in order to wash the walls of the reaction vessel as well as to assist in maintaining intimate contact and a uniform concentration of the reactants. Because the presence of oxygen tends to favor the formation of side reaction products, the reaction vessel should be exhausted, or the air swept out with gaseous nitrogen or the like before charging the reactor.

For good stability of the monohydroxy 1,2-polyoxypropylene aliphatic monoether products used as metal lubricants, a low ash content is desirable to diminish or avoid sludge formation and deposition of carbon. The ash content of addition products may be derived from the catalyst used in making them, and also from any ash-forming inorganic impurities present in the reaction mixture. By the absence or removal of low molecular weight glycols and the water associated therewith, the solubility of these ash-forming impurities, or substances which are determined as ash, is greatly decreased. Accordingly, the ash content of our products, particularly those made by the preferred method, may be reduced to provide metal lubricants of good stability.

For best control in making the monohydroxy polyoxyalkylene products, we have found it desirable to carry out the oxide addition under relatively moisture-free conditions, and to avoid side reactions which form water as a side reaction product. To dry the reaction vessels and connections, they may be swept out with dry, oxygen-free gas before introducing the charge. The catalyst should also be dry, or substantially so. The 1,2-propylene oxide should preferably be purified to remove moisture and any impurities which are capable of entering into side reactions which yield water. We have found that in order to produce compositions of superior stability and also to produce compositions having an average molecular weight of about 1000 to 2000 or higher or having only relatively small amounts of polyoxyalkylene glycols of molecular weight of about 500 to 600 and lower, it is desirable, and even essential for good results, that the moisture content of the 1,2-propylene oxide should not exceed about 0.1 per cent by weight. For best results where a low ash content and good stability are required, a moisture content not to exceed 0.05 per cent is desirable. It is recognized, however, that there may be a minimum amount or trace of moisture which is essential.

1,2-propylene oxide of the desired degree of dryness can be obtained by careful fractionation, or by distilling the oxide from solution in a hygroscopic glycol, for instance, ethylene glycol, diethylene glycol, propylene glycol or higher members of the glycol series and the like. The oxide vapor may also be scrubbed by means of a hygroscopic liquid. Some conditions of reaction, as for instance, a high reaction temperature, seem to favor the formation of glycols of low molecular weight, and any tendency toward glycol formation may become more pronounced the higher the reaction temperature. The oxyalkylene glycols thus formed are small in amount (i. e., less than about 5% of the reaction product) under our preferred reaction conditions, however, and the lower members of the series may be removed in a refining step, as by distillation or extraction with suitable solvents.

With such a strongly alkaline catalyst as sodium hydroxide, for instance, we prefer to neutralize the catalyst, upon completion of the reaction, with an acid which will react with the catalyst to form a salt having characteristics as favors its ready removal from the reaction product. To this end we have successfully used sulfuric acid and carbon dioxide. Preferably, the sulfuric acid is used in dilute aqueous solution. The salts formed by neutralization of the catalyst are insoluble in the reaction product after stripping it of such low boiling constituents, and may be removed mechanically as by filtering at a relatively high temperature.

Impurities, other than inorganic salts, which may be formed in the reaction products may include some water-soluble materials which are not the monohydroxy aliphatic monoethers of the present invention, depending upon the particular reaction conditions employed. Because of the relatively high average molecular weight of our products, their boiling temperatures are too high to permit distillation in ordinary vacuum equipment, and for the removal of water-soluble impurities it may be desirable to carry out an extraction step, prior to the stripping operation. Water or an aqueous salt solution may be used as the extractant. Such an extraction may be carried out advantageously at ordinary or a moderately elevated temperature of about 50° C. to 95° C., under pressure, if need be, because of the reduced solubility of the product with water and aqueous salt solution at such temperatures. Emulsification of the two phases is also avoided. In carrying out the extraction, we have found that the effect of sodium carbonate in favoring the formation of two phases is quite marked and that in many cases the degree of separation between the phases may be increased by saturating the aqueous solution with sodium carbonate or potassium carbonate.

When two phases are developed in the manner described, a small amount of the monohydroxy addition product may remain in the water or extract phase. Some water may also remain in the raffinate phase. By the addition of a third component which is a solvent for the product but a non-solvent for water, the product-solvent phase will contain less water, and less product will be present in the extract phase. Solvents which are suitable as assistants in making the hot water extractions are dichlordiethyl ether, dibutyl ether, butanol, hexanol, toluene, benzene, ethylene dichloride, and the like. By dissolving the product in such a solvent and washing the resultant solution at a temperature of about 95° C. to 98° C. with successive small portions of water, a substantially ash-free raffinate may be obtained with but slight loss of product. After removing the solvent from the solvent-product phase, as by distillation, the residue may be stripped of low boiling constituents by heating it under a reduced pressure which may be as low as about 1 or 2 millimeters and at an elevated temperature which may reach 180° C. or higher. Material appearing in the extract or aqueous phase may be recovered by removing the water, as by distillation, and filtering the residue to remove salt.

Used as lubricants, our new products are far superior to the alkylene oxide addition products that have been available in the past. We have found that our compositions will provide adequate lubrication in difficult applications where but imperfect lubrication is obtainable even with larger amounts of ordinary lubricants, such as animal, vegetable and mineral oils, their sulfonation products and the like. They are superior lubricants, we believe, because they possess to a high degree, the property of wetting the surfaces to which they may be applied: metals, rubber, textiles and the like. The lubrication persists, moreover, because of the lack of evaporation, the resistance to oxidation and the lack of gumming even at relatively high temperatures. The products have successfully been used as lubricants in internal combustion engines.

On textile fibers they produce a high quality lubrication and finish without a sulfonation step, and without the addition of the usual "oiliness" agents, heretofore employed with alkylene oxide addition products. In the lubrication of such natural textile fibers as wool, cotton, flax, hemp, and the like, it is believed that the persistence of the lubrication is due in large part, also, to the relatively high viscosity and the relatively large size of the molecules which hinder the lubricant from migrating from the surface into the inner structure of the fibers. In the lubrication of synthetic fibers, our products serve also as a finishing agent to give a more desirable "hand" to the fiber when the composition is permitted to remain thereon.

The compositions of this invention may be combined with suitable non-aqueous diluents for certain purposes, as in making fluids for hydraulic uses. Also, addition products of different viscosities may be blended.

The following examples will illustrate the invention. In all preparations, the propylene oxide was freed from aldehydes, water, and other impurities by careful distillation.

EXAMPLE 1.—ADDITION PRODUCT OF BUTANOL AND 1,2-PROPYLENE OXIDE HAVING AN AVERAGE OF EIGHT OXY 1,2-PROPYLENE GROUPS

Three hundred and sixty pounds (4.9 mols) of distilled normal butanol and 14.5 pounds of powdered sodium hydroxide were charged to a clean enclosed reactor equipped with an agitator, from which oxygen had been removed. This mixture was heated to 110° C. and 1,2-propylene oxide was introduced to the reactor, in which the temperature was maintained between 100° C. and 110° C. The rate of addition of propylene oxide was such that the pressure was maintained between 30 and 35 p. s. i. gauge. Reaction was continued until approximately 2600 pounds (45.2 mols) of propylene oxide were introduced. At the end of the reaction, 150 gallons of water were added and the alkali catalyst was neutralized by the addition of 21 pounds of carbon dioxide. After neutralization, an additional 200 gallons of water were added along with 150 gallons of benzene. This mixture was agitated to permit extraction of sodium carbonate from the product. After standing, an aqueous layer containing this salt was decanted.

One portion of the layer containing the product and the benzene was charged to a stripping still, and heated so that after 14 hours, the maximum temperature was 156° C. at an absolute pressure of 12 mm. of mercury. Forty gallons of distillate were removed and 135 gallons of product were recovered. A second portion of the product layer was heated in a stripping still for a period of 9 hours to a maximum temperature of 185° C. at an absolute pressure of 28.5 mm. of mercury. Approximately 80 gallons of benzene were removed as distillate and 135 gallons of residue product were recovered. Some of the benzene was discarded in the aqueous phase and the residue was free of benzene.

The residues from the two distillations were blended and filtered through a filter press containing a filter aid. The final product amounted to 2,785 pounds.

The physical properties of the material were determined and are represented in the following table:

| Temperature, °F.: | Viscosity in centistokes |
|---|---|
| 210 | 4.13 |
| 130 | 12.55 |
| 100 | 22.0 |
| 10 | 416 |
| 0 | 736 |
| −10 | 1358 |
| −20 | 2690 |

| Density, g. per cc.: | |
|---|---|
| 210° F | 0.9144 |
| 130° F | 0.9479 |
| 100° F | 0.9608 |

| Average molecular weight: | |
|---|---|
| Cryoscopic—benzene | 560 |
| Acetyl (acetyl chloride) | 543 |
| Acetyl (anhydride) | 572 |
| Menzies-Wright (benzene) | 684 |
| Rast (camphor) | 650 |

| | |
|---|---|
| Water content, per cent | 0.09 |
| Refractive index (20° C.) | 1.4435 |
| Flash point, °F | 385 |
| Fire point | 435 |
| Ash content, per cent | 0.00 |

| Natural rubber swelling: | |
|---|---|
| Anhydrous product, per cent | 7.05 |
| Water-saturated product, per cent | 5.72 |

This product is useful as a lubricant in the production of aluminum foil, and it is compatible with varnishes, lacquers, and water-dispersible pastes to the extent that removal of the lubricant is not required before these coatings are applied to the aluminum foil. It is also useful as a lubricant in the production of tin plate. The material is useful as a hydraulic brake fluid or as a lubricating component of a fluid for hydraulic brakes containing a suitable diluent.

EXAMPLE 2.—ADDITION PRODUCT OF BUTANOL AND 1,2-PROPYLENE OXIDE HAVING AN AVERAGE OF SIXTEEN OXY 1,2-PROPYLENE GROUPS

This preparation was carried out in a manner similar to that described above, wherein 210 pounds (2.84 mols) of purified normal butanol were charged to the agitator along with 15 pounds of powdered sodium hydroxide. The temperature was maintained at 100° C. to 110° C. and propylene oxide was added at such a rate that the operating pressure was maintained at 30 to 35 p. s. i. gauge until approximately 3200 pounds (55 mols) of propylene oxide were added.

In neutralizing the catalyst, 150 gallons of water were added along with 29 pounds of carbon dioxide. The mixture was agitated, and then an additional 200 gallons of water as well as 150 gallons of benzene were added. This mixture was circulated and decanted as before. The water layer discarded amounted to 440 gallons and the product layer amounted to about 520 gallons.

The product was divided into two portions for distillation; the first charge was 290 gallons, and this was heated for 6 hours to a final kettle temperature of 170° C. under an absolute pressure of one inch of mercury. The residue amounted to 175 gallons.

The second charge to the distilling column amounted to 230 gallons, and this was heated for 9 hours to a final kettle temperature of 180° C. at an absolute pressure of 1.5 inches of mercury. The residue amounted to 185 gallons. The two residues were mixed and filtered through a filter press having appropriate filter aids at approximately 20° C. The weight of the product amounted to 3,280 pounds.

The physical properties of the product were as follows:

| Temperature, °F.: | Viscosity in centistokes |
|---|---|
| 210 | 9.8 |
| 130 | 29.3 |
| 100 | 53.8 |
| 10 | 1449 |
| 0 | 2810 |

Density, g. per cc.:
- 210° F ———————————————— .9291
- 130° F ———————————————— .9617
- 100° F ———————————————— .9743

Average molecular weight:
- Acetyl (acetyl chloride) ———————— 860
- Menzies-Wright (benzene) ————————— 955
- Cryoscopic (benzene) ———————————— 1130
- Rast (camphor) —————————————————— 888

Refractive index, 20° C ———————————— 1.4472
Specific gravity, 20°/20° C ——————— 0.9895
Flash point, ° F —————————————————— 419
Fire point, ° F ——————————————————— 485
Water, per cent ——————————————————— .204
Ash content, per cent ————————————— 0.00
Bromine number, g. Br₂/100 g —————— 0.07
pH—10% in H₂O ————————————————————— 7.70

The product of this example is a suitable lubricating component for hydraulic brake fluids after appropriate dilution. Without dilution, it is suitable as a hydraulic fluid for use in recoil mechanism, feathering mechanisms for aircraft propellers and shock absorbers. It is also useful as a lubricant for the production of aluminum foil and tin plate.

EXAMPLE 3.—ADDITION PRODUCT OF BUTANOL AND 1,2-PROPYLENE OXIDE HAVING AN AVERAGE OF TWELVE OXY 1,2-PROPYLENE GROUPS

Sodium hydroxide, 0.475 mol, was dissolved in 6.75 mols of butanol and reacted with approximately 79.0 mols of propylene oxide containing 0.06% water by weight. The contents of the reactor were vigorously agitated and the temperature maintained at 95° C. The propylene oxide was added over a period of 34 hours at such a rate that the average pressure in the reactor was maintained at 30 p. s. i.

The reaction product was diluted with one-half its volume of water and acidified with carbon dioxide. The mixture was heated to 60° C. to 70° C. and allowed to separate at this temperature. The aqueous layer was discarded, and the product layer was charged to a still and all materials boiling below 170° C. to 180° C. at 10 mm. of mercury absolute pressure were removed. The hot residue was filtered at a temperature of 70° C. to 100° C. The physical properties of the material were determined as follows:

Temperature, °F.:     Viscosity in centistokes
- 210 ———————————————————————————— 6.35
- 130 ———————————————————————————— 18.02
- 100 ———————————————————————————— 31.82
- 77 ————————————————————————————— 55.59
- 32 ————————————————————————————— 284.4
- 0 —————————————————————————————— 1189
- −20 ————————————————————————————— 4759
- −40 ————————————————————————————— 26400

Density, g. per cc.:
- 210° F ———————————————————————— .921
- 100° F ———————————————————————— .967

Average molecular weight:
- Acetyl ———————————————————————— 666
- Cryoscopic (benzene) —————————— 757

Water, per cent ————————————————— 0.04
Pour point, ° F ————————————————— −55
Ash content, per cent ——————————— 0.000
Acidity—as per cent acetic acid — 0.005
Surface tension (dynes/sq. cm.) — 30.6

Practical tests on this product have shown its utility as a base lubricant in hydraulic fluids.

EXAMPLE 4.—ADDITION PRODUCT OF BUTANOL AND 1,2-PROPYLENE OXIDE HAVING AN AVERAGE OF SIXTEEN OXY 1,2-PROPYLENE UNITS

Sodium hydroxide, 0.5 mol, was dissolved in 4.86 mols of butanol and reacted with about 95 mols of propylene oxide containing 0.06% water. The reaction was carried out at an average temperature of 99° C. and 27 pounds p. s. i. pressure over a period of 51 hours. The contents of the reactor were vigorously agitated and the propylene oxide was fed uniformly to maintain the designated reaction temperature and pressure. The contents of the reactor were diluted with one-half their volume of water, neutralized with carbon dioxide, heated to 60° C. to 70° C., and the resultant water phase decanted. The product layer was charged to a still and stripped to a temperature of 170° C. to 180° C. at 10 mm. of mercury absolute pressure, and the hot product was filtered at 70° C. to 100° C. The physical properties of the resultant product were as follows:

Temperature, °F.:     Viscosity in centistokes
- 210 ———————————————————————————— 10.19
- 130 ———————————————————————————— 30.72
- 100 ———————————————————————————— 56.06
- 77 ————————————————————————————— 101.5
- 32 ————————————————————————————— 503.0
- 0 —————————————————————————————— 2740
- −20 ————————————————————————————— 11750
- −40 ————————————————————————————— 82730

Density, g. per cc.:
- 210° F ———————————————————————— .933
- 100° F ———————————————————————— .981

Average molecular weight:
- Acetyl (anhydride) ———————————— 900
- Acetyl (acetyl chloride) —————— 997

Pour point, °F ——————————————————— 45
Water, per cent ————————————————— 0.073
Ash content, per cent ——————————— 0.003
Acidity (as acetic), per cent —— 0.11
Surface tension (dynes/sq. cm.) — 30.8

The product of this example is an excellent base for hydraulic fluids and a good lubricant for tin plate and aluminum foil.

EXAMPLE 5.—ADDITION PRODUCT OF BUTANOL WITH 1,2-PROPYLENE OXIDE HAVING AN AVERAGE OF TWENTY-SIX OXY 1,2-PROPYLENE GROUPS

Sodium hydroxide, 0.23 mol, was dissolved in 3.37 mols of butanol and reacted with about 113 mols of propylene oxide containing 0.06% water over a period of 72 hours at 35 pounds p. s. i. at 96° C. The contents were agitated vigorously and the propylene oxide was fed regularly to maintain the reaction temperature and pressure at the designated values. The reaction product was mixed with one-half its volume of water and acidified with carbon dioxide until the pH was reduced to below 7. Avoidance of emulsification and the ease of separation was facilitated by keeping the temperature between 60° C. and 70° C. The water phase was discarded and the product phase was distilled to remove all products boiling below 160° C. to 180° C. at 10 mm. The distillation step removed polypropylene glycols of low molecular weight. Several products prepared according to this method were blended to yield a lubricating composition of the following properties:

| Temperature, °F.: | Viscosity in centistokes |
|---|---|
| 210 | 16.37 |
| 130 | 51.53 |
| 100 | 96.93 |
| 77 | 178.9 |
| 32 | 938.7 |
| 0 | 5551 |
| −20 | 25670 |

Density, g. per cc.:
 210° F _____ .937
 100° F _____ .983
Average molecular weight:
 Acetyl (anhydride) _____ 1571
 Acetyl (acetyl chloride) _____ 1347
 Cryoscopic (benzene) _____ 1750
Water, per cent _____ 0.06
Ash content, per cent _____ 0.00
Acidity (as acetic acid), per cent _____ 0.002
Surface tension, 25° C. (dynes/sq. cm.) ____ 31.4

This product is serviceable as a heavy lubricant which is usable at low temperatures.

EXAMPLE 6.—BUTANOL-1,2-PROPYLENE OXIDE ADDITION PRODUCTS OF VARYING MOLECULAR WEIGHTS

A series of fluids were made by charging a stainless steel reactor with butanol and a sodium butylate catalyst, passing 1,2-propylene oxide to the reactor, and withdrawing samples of the product during the course of the reaction.

The sodium alcoholate used as a catalyst was added to the alcohol initially charged to the reactor and no subsequent additions of catalyst were made. Each reaction was made without interruption, the various samples being removed when the desired molecular weight as calculated from the charging ratios had been obtained. In general, it was found that the determined average molecular weights were less than the molecular weights calculated from the charging ratio, and the discrepancy increased with increasing average molecular weight.

Each sample withdrawn was purified by stripping off the unreacted oxide, then diluting with water amounting to 50% of the reaction product. The catalyst was then neutralized with carbon dioxide and the salts and other impurities extracted with hot water. The product layer was heated in a distillation column to 180° C. at a pressure less than 50 mm. of mercury and held at this temperature for one hour.

Reaction conditions are tabulated below:

Table A

Initial charge to reactor: Pounds
 Butanol _____ 30.0
 Sodium Butylate _____ 10.5

| Step | 1 | 2 | 3 | 4 | 5 | 6 | 7 | 8 | 9 | 10 |
|---|---|---|---|---|---|---|---|---|---|---|
| Charge: | | | | | | | | | | |
| Product of preceding step, lb. | | 15 | 37 | 81 | 50 | 70.4 | 50 | 62 | 82 | 50 |
| Contained sodium butylate, lb.[1] | 10.5 | 1.3 | 1.13 | 1.05 | 0.47 | 0.44 | 0.20 | 0.17 | 0.16 | 0.06 |
| Propylene oxide, lb. | 80 | 27.5 | 49.9 | 29 | 25.4 | 34.6 | 19.8 | 25.5 | 45.6 | 14.5 |
| Temperature, °C. | 110–118 | 115–120 | 119–122 | 116–118 | 108–120 | 104–112 | 112–120 | 108–120 | 105–121 | 118–120 |
| Pressure, lb. gauge | 0–33 | 10–50 | 8–45 | 17–50 | 0–47 | 27–52 | 15–52 | 25–62 | 25–65 | 10–58 |

[1] The calculated amount present.

The viscosities and average molecular weights of the products of steps 2 to 10 were determined as follows:

Table B

| Step No. | Av. Mol. Weight | | Viscosity in Centistokes | | | | | |
|---|---|---|---|---|---|---|---|---|
| | Menzies-Wright | Acetyl | 210° F. | 100° F. | 20° F. | 0° F. | −20° F. | −40° F. |
| 10 | 1,800 | 1,598 | 31.1 | 195 | 3,675 | 13,900 | | |
| 9 | 1,675 | 1,540 | 28.5 | 176 | 3,230 | 12,050 | | |
| 8 | 1,595 | 1,415 | 23.1 | 140.8 | 2,540 | 9,350 | | |
| 7 | 1,530 | 1,318 | 16.5 | 101.2 | 1,780 | 6,500 | 30,200 | |
| 6 | 1,430 | 1,193 | 15.1 | 87.5 | 1,485 | 5,360 | 24,400 | |
| 5 | 1,288 | 1,122 | 12.0 | 69.2 | 1,050 | 3,650 | 16,600 | |
| 4 | 975 | 940 | 8.95 | 47.5 | 659 | 2,180 | 9,020 | |
| 3 | 875 | 838 | 7.27 | 37.6 | 508 | 1,565 | 6,410 | 38,950 |
| 2 | 480 | 429 | 3.18 | 13.8 | 132 | 359 | 1,170 | 5,000 |

Other physical properties of the product are given in the table below:

Table C

| Step No. | Density, gm. per cc. | | Pour Point, °F. | Surface Tension, dynes/cm. | Refractive Index, 20° C. | Molecular Refraction | |
|---|---|---|---|---|---|---|---|
| | 210° F. | 20° C. | | | | Found | Calc. |
| 10 | .9393 | .9973 | −32.8 | 35.3 | 1.4506 | 481 | 480 |
| 9 | .9388 | .9963 | −34.6 | 35.1 | 1.4509 | 416 | 414 |
| 8 | .9365 | .9948 | −41.8 | 34.8 | 1.4502 | 383 | 380 |
| 7 | .9357 | .9937 | −40.0 | 34.8 | 1.4495 | 356 | 355 |
| 6 | .9339 | .9920 | −45.4 | 34.6 | 1.4490 | 323 | 321 |
| 5 | .9312 | .9890 | −47.2 | 34.6 | 1.4485 | 304 | 302 |
| 4 | .9258 | .9845 | −49.0 | 34.2 | 1.4470 | 256 | 253 |
| 3 | .9232 | .9817 | −58.0 | 33.7 | 1.4465 | 228 | 227 |
| 2 | .9029 | .9635 | <−58.0 | | 1.4408 | 115 | 117 |

The bromine numbers of the products of steps 10, 9 and 8 were 0.07, 0.136, and 0.00, respectively, grams of bromine absorbed per 100 grams of product.

The close correlation of the physical properties, such as viscosity, density, refractive index and molecular refractions, with the average molecular weights, and from the approximate correlation of molecular weights determined by acetalization with those determined by ebullioscopy, it is concluded that the products of this invention are polyoxypropylene compounds having the alcohol radical at one end of the chain and a free hydroxyl group at the other. It has been demonstrated that the products are colorless, that they have negligible bromine numbers, and they may be made substantially free of polyoxypropylene compounds of low molecular weights. It is believed, however, that they do contain a small amount of polyoxypropylene glycols of high molecular weight.

EXAMPLE 7.—ADDITION PRODUCTS OF A TETRADECANOL WITH 1,2-PROPYLENE OXIDE HAVING VARYING MOLECULAR WEIGHTS

In a similar manner as described in Example 6, addition products of 7-ethyl-2-methyl undecanol-4 with propylene oxide were prepared. The average molecular weights and viscosities of these products are as follows:

Table D

| Av. Mol. Weight | | Viscosity in Centistokes | | | | |
|---|---|---|---|---|---|---|
| Menzies-Wright | Acetyl | 210° F. | 130° F. | 100° F. | 20° F. | 0° F. |
| 1,775 | 1,554 | 27.7 | 91.3 | 176.5 | 3,520 | 13,340 |
| 1,675 | 1,731 | 27.1 | 89.2 | 172.5 | 3,400 | 12,900 |
| 1,525 | 1,568 | 22.5 | 74.2 | 144.0 | 2,840 | 10,730 |
| 1,350 | 1,279 | 17.3 | 56.6 | 109.1 | 2,110 | 7,930 |
| 975 | 897 | 10.8 | 34.8 | 67.5 | 1,280 | 4,740 |
| 510 | 499 | 4.96 | 15.5 | 30.0 | 547 | 1,885 |

Other physical properties of the products are given in the following table:

Table E

| Molecular Wt. by Acetyl Values | Pour Point, °F. | Density, gm. per cc. | | Refractive Index, 20° C. | Bromine No. g. Br₂ per 100 g. |
|---|---|---|---|---|---|
| | | 210° F. | 20° C. | | |
| 1,554 | −38 | .9326 | .993 | 1.4505 | 0.204 |
| 1,731 | −42 | .9320 | .992 | 1.4506 | 0.204 |
| 1,568 | −45 | .9284 | .988 | 1.4501 | 0.204 |
| 1,279 | −45 | .9217 | .982 | 1.4499 | ---------- |
| 897 | −53 | .9056 | .965 | 1.4490 | ---------- |
| 499 | −60 | .8659 | .927 | 1.4471 | ---------- |

The long chain alcohol employed as the starting material affects such properties as viscosity, water-solubility and oil miscibility, and these effects are more pronounced in the range of lower molecular weights.

EXAMPLE 8.—ADDITION PRODUCTS OF METHANOL WITH 1,2-PROPYLENE OXIDE

In a manner similar to that described in Example 6, addition products of 1,2-propylene oxide with methanol were prepared. The viscosities and average molecular weights of these products are given in the table below:

Table F

| Av. Mol. Weight | | Viscosity in Centistokes | | | | |
|---|---|---|---|---|---|---|
| Menzies-Wright | Acetyl | 210° F. | 100° F. | 0° F. | −20° F. | −40° F. |
| 1,675 | 1,661 | 26.31 | 162.42 | 11,600 | ---------- | ---------- |
| 1,660 | 1,625 | 24.95 | 152.2 | 10,680 | ---------- | ---------- |
| 1,650 | 1,563 | 24.23 | 149.2 | 10,400 | ---------- | ---------- |
| 1,500 | 1,418 | 17.86 | 106.7 | 6,920 | ---------- | ---------- |
| 1,150 | 1,110 | 11.13 | 63.20 | 3,600 | 16,350 | ---------- |
| 913 | 907 | 8.13 | 43.60 | 2,230 | 9,300 | 61,500 |
| 547 | 530 | 3.98 | 18.45 | 622 | 2,330 | 12,170 |

Other physical properties of the methanol addition products are given in the table below:

Table G

| Acetyl Molecular Weight | Pour Point, °F. | Density, gm. per cc. | | Refractive Index 20° C. | Bromine No. g. Br per 100 g. |
|---|---|---|---|---|---|
| | | 210° F. | 20° C. | | |
| 1,661 | −38.5 | .9410 | .9985 | 1.4503 | 0.007 |
| 1,625 | −39.5 | .9402 | .9978 | 1.4499 | 0.007 |
| 1,536 | −40 | .9407 | .9978 | 1.4501 | 0.007 |
| 1,418 | −43 | .9400 | .9970 | 1.4492 | ---------- |
| 1,110 | −41.8 | .9374 | .9953 | 1.4481 | ---------- |
| 907 | −72.4 | .9344 | .9925 | 1.4470 | ---------- |
| 530 | −76 | .9267 | .9878 | 1.4430 | ---------- |

A composition of greater hydrocarbon miscibility results from blending the product of this example with that of the preceding example in accordance with the proportions of each selected.

Modifications of the invention other than shown by the foregoing examples will be apparent to those skilled in the art and are included within the scope of the invention.

We claim:

1. Method of making liquid, water-immiscible, monohydroxy 1,2-polyoxypropylene aliphatic monoethers having an average of at least nine oxy 1,2-propylene groups to the molecule, which comprises introducing to a heated liquid body of an aliphatic monohydric alcohol having from 1 to 20 carbon atoms and containing an alkali metal hydroxide catalyst dispersed therein and being substantially free of water, 1,2-propylene oxide substantially free of aldehydes and containing less than about 0.1% water by weight, the rate of introduction of the oxide being such as to maintain a substantially uniform concentration of unreacted oxide in the reaction zone, the temperature being maintained at 80 to 130° C.

2. Method of making liquid, water-immiscible, monohydroxy 1,2-polyoxypropylene aliphatic monoethers having an average of at least nine oxy 1,2-propylene groups to the molecule, which comprises introducing to a heated liquid body of an aliphatic monohydric alcohol having from 1 to 20 carbon atoms and containing an alkaline catalyst dispersed therein and being substantially free of water, 1,2-propylene oxide substantially free of aldehydes and containing less than about 0.1% water by weight, the rate of introduction of the oxide being such as to maintain a substantially uniform concentration of unreacted oxide in the reaction zone the temperature being maintained at 80 to 130° C., and substantially removing lower propylene oxide adducts by mixing said monoethers with water and separating an aqueous phase.

3. Compositions of matter having lubricating properties predominantly comprising liquid, water-immiscible monohydroxy 1,2-polyoxypropylene monoethers having an average molecule weight by acetyl values between 1000 and 3000, said monoethers being obtained by adding propylene oxide to a heated body of a liquid acyclic alkanol having from 1 to 20 carbon atoms and containing an alkaline catalyst at such a rate as to maintain a substantially uniform concentration of unreacted propylene oxide in the reaction zone, said monoethers being further characterized by having a viscosity of at least about seven centistokes at 210° F. and being further characterized by their ratio of kinematic viscosity at 100° F. to their kinematic viscosity at 210° F. being less than 6.6, by thermochemical stability at 500° F., and by pour points lower than −20° F.

4. Compositions of matter having lubricating properties predominantly comprising liquid, water-immiscible monohydroxy 1,2-polyoxypropylene monoethers having an average molecular weight by acetyl values between 1000 and 1600, said monoethers being obtained by adding propylene oxide to a heated body of butanol containing an alkaline catalyst at such a rate as to maintain a substantially uniform concentration of unreacted propylene oxide in the reaction zone, said monoethers being further characterized by having a viscosity of at least about ten centistokes at 210° F., by their ratio of kinematic viscosity at 100° F. to their kinematic viscosity at 210° F. being less than 6.6, by thermochemical stability at 500° F., and by pour points lower than −20° F.

5. Compositions of matter having lubricating properties predominantly comprising liquid, water-immiscible monohydroxy 1,2-polyoxypropylene monoethers having an average molecular weight by acetyl values between 1000 and 1600, said monoethers being obtained by adding propylene oxide to a heated body of methanol containing an alkaline catalyst at such a rate as to maintain a substantially uniform concentration of unreacted propylene oxide in the reaction zone, said monoethers being further characterized by having a viscosity of at least about 9.5 centistokes at 210° F., by their ratio of kinematic viscosity at 100° F. to their kinematic viscosity at 210° F. being less than 6.6, by thermochemical stability at 500° F., and by pour points lower than −20° F.

6. Compositions of matter having lubricating properties predominantly comprising liquid, water-immiscible monohydroxy 1,2-polyoxypropylene monoethers having an average molecular weight by acetyl values between 1000 and 1600, said monoethers being obtained by adding propylene oxide to a heated body of a tetradecanol containing an alkaline catalyst at such a rate as to maintain a substantially uniform concentration of unreacted propylene oxide in the reaction zone, said monoethers being further characterized by having a viscosity of at least about 12.6 centistokes at 210° F., by their ratio of kinematic viscosity at 100° F. to their kinematic viscosity at 210° F. being less than 6.6, by thermochemical stability at 500° F., and by pour points lower than −20° F.

HARVEY R. FIFE.
FREDERICK H. ROBERTS.

REFERENCES CITED

The following references are of record in the file of this patent:

UNITED STATES PATENTS

| Number | Name | Date |
|---|---|---|
| 1,633,927 | Davidson | June 28, 1927 |
| 1,921,378 | Webel | Aug. 8, 1933 |
| 2,213,477 | Steindorff | Sept. 3, 1940 |

FOREIGN PATENTS

| Number | Country | Date |
|---|---|---|
| 317,770 | Great Britain | Aug. 19, 1929 |
| 605,973 | Germany | Nov. 22, 1934 |